United States Patent
Mussari et al.

(10) Patent No.: US 10,669,182 B2
(45) Date of Patent: Jun. 2, 2020

(54) SYSTEMS AND METHODS FOR USING CHLORINE DIOXIDE TO ENHANCE DRYING

(71) Applicant: BCR ENVIRONMENTAL CORPORATION, Jacksonville, FL (US)

(72) Inventors: Frederick P. Mussari, Melbourne, FL (US); Michael Phillip Norris, Jacksonville, FL (US)

(73) Assignee: BCR ENVIRONMENTAL CORPORATION, Jacksonville, FL (US)

( * ) Notice: Subject to any disclaimer, the term of this patent is extended or adjusted under 35 U.S.C. 154(b) by 0 days.

(21) Appl. No.: 15/760,737

(22) PCT Filed: Sep. 16, 2016

(86) PCT No.: PCT/US2016/052168
§ 371 (c)(1),
(2) Date: Mar. 16, 2018

(87) PCT Pub. No.: WO2017/049108
PCT Pub. Date: Mar. 23, 2017

(65) Prior Publication Data
US 2018/0257967 A1 Sep. 13, 2018

Related U.S. Application Data

(60) Provisional application No. 62/219,913, filed on Sep. 17, 2015.

(51) Int. Cl.
C02F 1/02 (2006.01)
C02F 1/52 (2006.01)
(Continued)

(52) U.S. Cl.
CPC ............... *C02F 11/14* (2013.01); *C02F 1/02* (2013.01); *C02F 1/5236* (2013.01); *C02F 1/76* (2013.01);
(Continued)

(58) Field of Classification Search
CPC ....... C02F 11/06; C02F 11/122; C02F 11/123; C02F 11/125; C02F 11/127; C02F 11/14;
(Continued)

(56) References Cited

U.S. PATENT DOCUMENTS

| 4,330,411 A | 5/1982 | Florin et al. |
| 4,933,086 A * | 6/1990 | McMahon ............... C02F 11/10 210/603 |

(Continued)

FOREIGN PATENT DOCUMENTS

| GB | 2182920 A | 5/1987 |
| JP | 2000140893 A | 5/2000 |

OTHER PUBLICATIONS

"Primary vs. Secondary Sludge" ClearCove: Clean Energy Clean water, blog posting from Jan. 24, 2014 (obtained from clearcovesystems.com Aug. 2019) (Year: 2014).*

(Continued)

*Primary Examiner* — Lucas A Stelling
(74) *Attorney, Agent, or Firm* — Lando & Anastasi, LLP (57) ABSTRACT

A method and system comprising use of chlorine dioxide to alter the particle size distribution and facilitate removal of water from wastewater, for example sludge or biosolids. The method uses chlorine dioxide to alter the rheology of the wastewater to improve the efficiency of drying the wastewater, to meet regulatory standards for beneficial use or energy production.

17 Claims, 4 Drawing Sheets

(51) Int. Cl.
  *C02F 1/76*  (2006.01)
  *C02F 11/06*  (2006.01)
  *C02F 11/122*  (2019.01)
  *C02F 11/123*  (2019.01)
  *C02F 11/125*  (2019.01)
  *C02F 11/127*  (2019.01)
  *C02F 11/14*  (2019.01)

(52) U.S. Cl.
  CPC ............ *C02F 11/06* (2013.01); *C02F 11/127* (2013.01); *C02F 11/122* (2013.01); *C02F 11/123* (2013.01); *C02F 11/125* (2013.01); *C02F 2303/26* (2013.01); *Y02W 10/37* (2015.05); *Y02W 10/40* (2015.05)

(58) Field of Classification Search
  CPC ...... C02F 2303/26; C02F 1/52; C02F 1/5236; C02F 1/76; C02F 1/763; Y02W 10/37; Y02W 10/40
  See application file for complete search history.

(56) References Cited

U.S. PATENT DOCUMENTS

| | | |
|---|---|---|
| 7,089,684 B2 | 8/2006 | Genier |
| 7,279,099 B2 | 10/2007 | Reimers et al. |
| 8,663,473 B2 | 3/2014 | Mussari |
| 2002/0125196 A1* | 9/2002 | Rosenblatt ............... C02F 1/76 210/721 |
| 2006/0039841 A1* | 2/2006 | Rico ...................... C02F 1/688 422/305 |
| 2013/0134090 A1 | 5/2013 | Mussari |
| 2013/0134092 A1 | 5/2013 | Mussari et al. |

OTHER PUBLICATIONS

International Search Report and Written Opinion from corresponding International Application No. PCT/US2016/052168 dated Nov. 18, 2016.

Extended European Search Report from European Application No. 16847405.4 dated Jan. 7, 2019.

\* cited by examiner

SYSTEMS AND METHODS FOR USING CHLORINE DIOXIDE TO ENHANCE DRYING

CROSS-REFERENCE TO RELATED APPLICATIONS

This application is a U.S. National Phase Application under 35 U.S.C. § 371 of International PCT Application Serial No. PCT/US2016/052168, titled SYSTEMS AND METHODS FOR USING CHLORINE DIOXIDE TO ENHANCE DRYING, and filed Sep. 16, 2016, which claims the benefit under 35 U.S.C. § 119 of U.S. Provisional Patent Application Ser. No. 62/219,913, titled SYSTEMS AND METHODS FOR USING CHLORINE DIOXIDE TO ENHANCE DRYING, and filed Sep. 17, 2015, the entire disclosure each of which is hereby incorporated herein by reference in its entirety for all purposes.

FIELD OF THE TECHNOLOGY

Enhanced drying of wastewater residuals, for example, sludge or biosolids are provided through oxidation. More specifically, enhanced drying may be performed through chlorine dioxide treatment.

SUMMARY

In accordance with one or more aspects, a method of treating a sludge or biosolids in a wastewater treatment system may comprise treating the sludge or biosolids with chlorine dioxide to form a pretreated biosolids, dewatering the pretreated biosolids to provide a dewatered biosolids, and drying the dewatered biosolids to provide a dried biosolids.

In some embodiments, the method may further comprise introducing the dried biosolids as a fuel source for the wastewater treatment system. In some embodiments, the dried biosolids have a dry solids content of at least about 70%. In some embodiments, the method may further comprise introducing the dried biosolids to the wastewater treatment system as a sole fuel source for drying the dewatered biosolids. In some embodiments, drying the dewatered biosolids comprises passing the dewatered biosolids through a dryer. In some embodiments, the dewatered biosolids may have a dry solids content of about 16% to about 40%.

In some embodiments, the method may further comprise burning the dried biosolids. In some embodiments, burning the dried biosolids comprises incineration.

In some embodiments, the pretreated biosolids achieve Class B biosolids standards according to U.S. Environmental Protection Agency regulations.

In some embodiments, the dried biosolids achieve Class A biosolids standards according to U.S. Environmental Protection Agency regulations.

In some embodiments, a dosage of chlorine dioxide is about 40 ppm to about 60 ppm.

In accordance with one or more aspects, a method for altering the rheology of a sludge to facilitate removal of free and bound water may comprise adding chlorine dioxide to the sludge to alter the sludge zeta potential toward a neutral value, dewatering the sludge to provide a dewatered biosolids, and drying the dewatered biosolids to provide a dried biosolids.

In accordance with one or more aspects, a system for treating a sludge or biosolids may comprise a chlorine dioxide dosing system fluidly connected to a source of sludge or biosolids, a dewatering device downstream of the chlorine dioxide dosing system, and a dryer fluidly connected to and downstream of the dewatering device.

In some embodiments, the dewatering device is a centrifuge.

In some embodiments, the system further comprises a conveyor positioned downstream of the centrifuge and upstream of the dryer that does not alter the particle size distribution prior to introducing the sludge for thermal drying.

Still other aspects, embodiments, and advantages of these exemplary aspects and embodiments, are discussed in detail below. Any embodiment disclosed herein may be combined with any other embodiment in any manner consistent with at least one of the objects, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

BRIEF DESCRIPTION OF THE DRAWINGS

Certain illustrative features and examples are described below with reference to the accompanying figures in which.

It will be recognized by the person of ordinary skill in the art, given the benefit of this disclosure, that the dimensions, sizes, components, and views shown in the figures are for illustrative purposes. Other dimensions, representations, features, and components may also be included in the embodiments disclosed herein without departing from the scope of the description.

DETAILED DESCRIPTION

The present disclosure relates to a system for the enhanced drying of wastewater residuals, for example, sludge or biosolids through the methods disclosed herein. For example, oxidation of the wastewater, sludge, or biosolids may be performed prior to downstream treatments, which may include dewatering of biosolids. In particular, the disclosure relates to methods of using chlorine dioxide to modify the characteristics of wastewater sludge or biosolids to enhance water removal. The addition of chlorine dioxide to the process may provide for an altering of the particle size distribution during dewatering to increase the surface area of the material and to alter the stickiness of the sludge which may facilitate drying. The dewatering may be performed through centrifuging. Other dewatering methods may be employed, for example, filtration, belt presses, and screw presses. Other dewatering devices, such as plate and frame presses may be capable of removing more water from biosolids. The disclosure relates to methods of using chlorine dioxide with other downstream processes such as dewatering and drying, in order to produce an undigested product.

Wastewater treatment is generally a multi-stage process. An early stage of municipal wastewater treatment is the removal of nutrients from the wastewater. This removal is typically accomplished by a biological process, in which a biological sludge is produced by the buildup of cell mass. Once treated to reduce pathogens or stabilize the material, this biological sludge is referred to as biosolids. Municipal biosolids may be thickened or dewatered to reduce water volume prior to final disposal. The term "thickened" is generally used to denote a reduction in water content of the sludge or biosolids. The term "dewatered" is generally used to denote a reduction in water content greater than that achieved by "thickening." There may, however, be some overlap in the range of percentages of water content in biosolids that are referred to as "thickened" or "dewatered." "Thickening" generally refers to a process in which the liquid fraction of the sludge or biosolids is reduced and the solids fraction is increased to up to 15%, while "dewatering" generally refers to a process in which the solids fraction is increased to 15% or greater.

Dewatered biosolids may be used as fertilizer or soil amendment. Biosolids are sometimes not beneficially reused and are disposed of in sanitary landfills. Since biosolids do contain nitrogen, phosphorus and other nutrients that have value as a fertilizer, and also have potential value as a fuel, there is a need to dewater the treated biosolids prior to final disposition in order to reduce the cost of transportation, concentrate the nutrient value, and reduce the amount of energy required to utilize the material as a fuel.

There are four types of water in municipal biosolids. One type of water is free water, which is not bound to the particles. Free water represents the largest portion of water in biosolids. In some embodiments, free water represents about 70-75% of water in biosolids. A second type of water is interstitial or capillary water, which is bound by capillary forces between the sludge floc or trapped in interstitial spaces. A third type of water is surface or vicinal water that is held tightly to the solids particle surface by hydrogen bonding. Finally, intracellular water, or chemically bound water within the particle structure is present in biosolids.

Typical mechanical dewatering methods require the addition of polymer to facilitate dewatering and produce a dewatered material that is usually in the range of 16-25% total solids. Polymer addition can account for roughly 30% of the cost of biosolids treatment and disposal.

Traditional (mechanical) dewatering methods may require the addition of polymer to remove primarily free water and some interstitial water.

Sludge drying is one method of further reducing the mass of biosolids prior to disposal. The heat required to evaporate water from the biosolids in the drying process can also result in disinfection of the biosolids to meet EPA Class A disinfection requirements as a result of the time and temperatures achieved in the process. The resulting material can then be beneficially used as a fertilizer. Class A Biosolids is a designation for dewatered and heated sewage sludge that meets U.S. EPA guidelines for land application with no restrictions (40 Code of Federal Regulations (CFR) Part 503). The term EQ (Exceptional Quality) is used to describe a biosolids product that not only meets Class A pathogen reduction requirements, but also meets requirements for low concentrations of pollutant metals. Class A/EQ biosolids standards are in accordance with the United States Title 40 CFR Part 503.

Class B biosolids standards are in accordance with Title 40 CFR Part 503. There are numerous methods for the removal of water from municipal sludge or biosolids. Sludge drying is commonly accomplished by thermal or solar methods. In the case of thermal methods, the energy is supplied by natural gas, propane, or various forms of waste heat from other processes. The energy can also be supplied by biological processes, which are economical but slow.

The cost of energy to evaporate water from sludge in a short time period has historically made this process commercially difficult, as it is borderline economically unfeasible.

Solar dryers have become popular because of the use of "free" energy. These may have numerous other issues, including large space requirements, long processing times and poor transfer of heat within the material. Operating costs of solar drying systems can be competitive, but the characteristic feature of solar drying is the dependence on radiation intensity, which varies not only with daily cycles, but also with climate and seasonal variations. Even under ideal conditions, solar drying can take 7-12 days.

Conventional thermal drying involves heat transfer through direct or indirect hot gas transfer. This process can occur in a very short time (minutes), however there is a tradeoff between low energy (long processing time) and high energy consumption required to shorten the processing time.

There is a need in the field to reduce the energy required to remove water from wastewater residuals, thus making the process more efficient, economical, and more environmentally friendly.

In the present disclosure, a method is provided that makes the process of drying sludge more efficient. The disclosure comprises adding chlorine dioxide to wastewater, for example, liquid sludge prior to dewatering to produce a change in particle size distribution during the dewatering process, with a greater mass distribution of smaller size particles, thus a substantial increase in surface area of the dewatered material. This chlorine dioxide treated wastewater may provide for Class B biosolids. The disclosure also provides for altered characteristics of the sludge so that after conventional dewatering, a sludge sticky phase is altered to allow for more efficient drying. By "sticky," it is meant that the sludge agglomerates more readily and the sludge is more difficult to dry. The systems and methods of the present disclosure avoid the sticky phase normally observed in sludge drying. This allows for passing a dewatered biosolids through a dryer in single-pass drying, with no back-feed.

Other chemical oxidation techniques such as ozone, $O_2$ (wet oxidation), and hydrogen peroxide/ferrous ions (classic Fenton oxidation) have negative effects. For example, ozone has a negative effect on sludge dewaterability. Proteins released by cell lysis have a negative effect on sludge dewatering and the unsettled micro-particles may have an influence on sludge filtration leading to a more compact filtration layer with reduced permeation of liquids. The dewaterability of treated sludge decreases with an increase in ozone dose. Thus a higher polymer dose is required for sludge flocculation. This is not the case with chlorine dioxide.

The addition of chlorine dioxide decreases the zeta potential of the sludge, enhancing flocculation or coagulation. Municipal sludge is partially colloidal in nature. The typically negative charge of sludge particles causes the particles to repel each other. An increase in zeta potential may lead to less agglomeration of solids. Chlorine dioxide addition also reduces the sludge viscosity. These four factors resulting from the addition of a single chemical additive result in a significant increase in the electro-osmotic flow.

Chlorine dioxide may be generated on-site at a wastewater treatment system to provide a source of disinfectant. Upon exposure to sufficient levels of chlorine dioxide for a sufficient period of time, the gross levels of bacteria in the wastewater biosolids stream are reduced to allowable levels for discharge from the wastewater treatment plant.

The dosage of chlorine dioxide may be provided to provide for one or more of disinfection, enhancement of dewatering, and reduction of odors. The dosage of chlorine dioxide may be provided to achieve a Class B biosolids product. In certain embodiments, the dosage of chlorine dioxide may be in a range of about 40 to about 60 ppm, although other ranges are contemplated by this disclosure.

Starting with non-dewatered biosolids (the term "dewatered" is generally used to denote a reduction in water content resulting in a solids fraction of 15% or greater), the disclosure changes the particle size distribution of the material during the dewatering process, resulting in increased surface area. This method also changes the rheology of the material, making it less sticky.

Once modified, the material may be subjected to polymer addition and dewatered using a centrifuge. The particle size distribution of the resulting dewatered material contains a much higher proportion of the mass distributed in smaller particles, thereby increasing the surface area of the material resulting in a marked increase in the drying rate. In addition, the change in flow characteristics makes the dewatered material less sticky, and prevents material from adhering to the drying equipment (drum). In certain embodiments, due to the addition of chlorine dioxide prior to centrifugation, the amount of polymer required may be lower as compared to a process that does not add chlorine dioxide to its treatment system.

Much of the work that has been done to describe this sludge 'sticky phase' was developed by Bart Peeters in his Doctoral Dissertation at the Arenberg Doctoral School of Science, Engineering & Technology, Leuven, Belgium in 2011.

Figure 1:
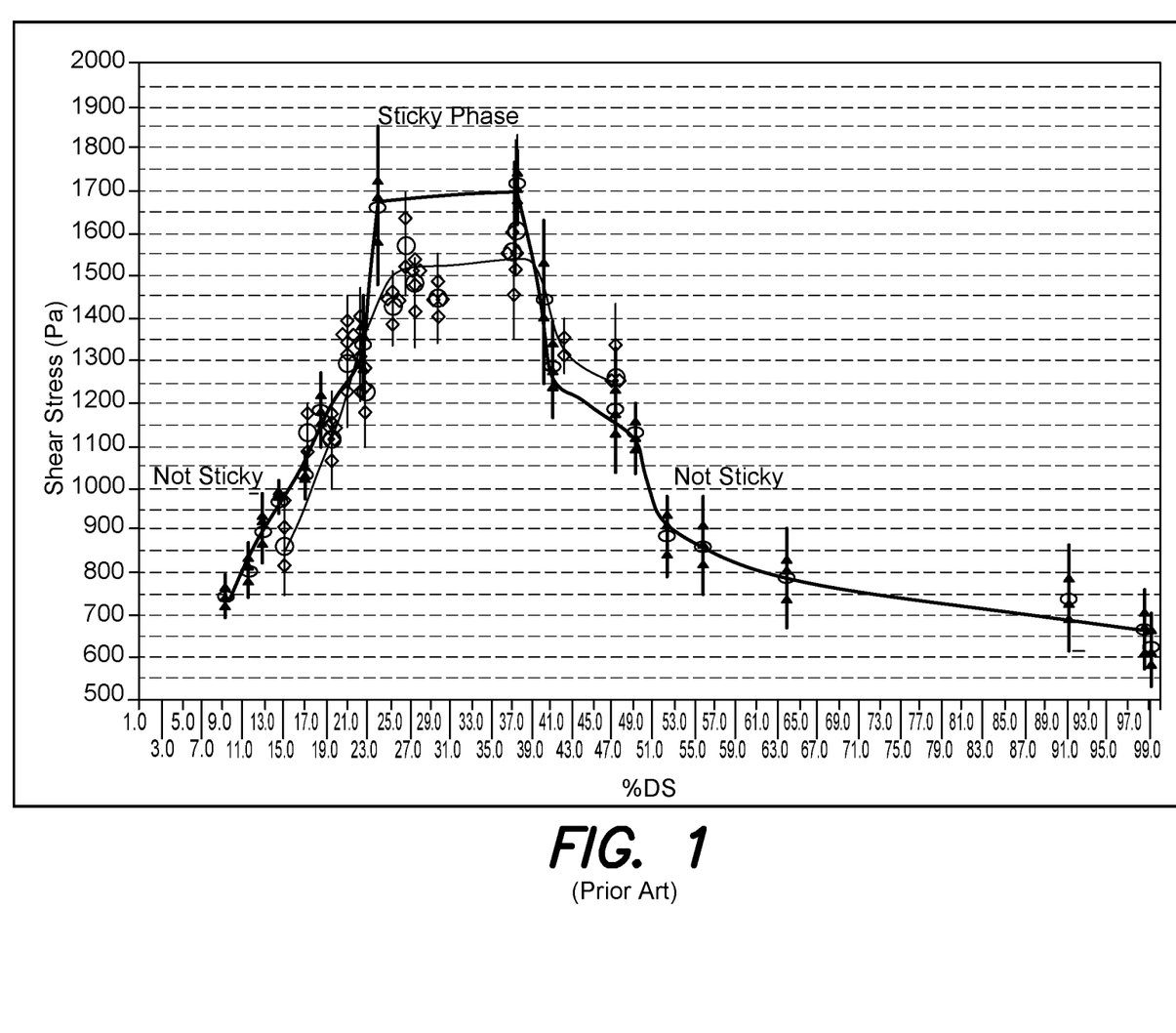
FIG. 1 shows a plot of shear stress versus percent dry solids.

FIG. 1 shows a map of the 'sticky' phase of drying sludge. From this map, the use of polyaluminiumchloride (PACl) coagulant as a conditioner of waste sludge prior to dewatering and drying was developed to reduce the sludge's intrinsic sticky behavior. For centrifugal dewatering of sludge, the conveyance torque rises abruptly once the sludge reaches this sticky phase, which is generally accepted to occur at total solids concentrations around 21-37% total solids.

Referring still to FIG. 1, a plot of shear stress versus percent dry solids is shown. The highest shear stress is seen at the upper limit of sludge total solids resulting from centrifugal dewatering (~21%) and carries through the early stage of the drying process (~37%). The impact of being able to reduce shear stress in this range is therefore of benefit to both the dewatering and drying process, whereby the dewatering is enhanced prior to drying, and the early stages of drying are enhanced as a result of both the smaller particle size (increase in surface area) and the reduction in the sticky phase of the material. Sludge in the early stage of drying has a tendency to adhere to the walls of the dryer, causing dryer fouling and creating the need to back-feed material in order to raise the average total solids (in effect, to push the feed material through the sticky phase). The current disclosure reduces or eliminates the tendency of the sludge to enter this sticky/gluey phase, allowing for material to be dried in one pass (no back-feed is required). This greatly enhances the efficiency of sludge drying.

The mechanism of this sludge stickiness may be attributed to the action of extracellular polymeric substances (EPS) surrounding the micro-organisms in the sludge. There may also be an effect on the bound water and free water in the sludge floc. Free water is removed much more easily (requires less energy input) than bound water. These two types (free and bound) make up the largest percentage of water in municipal sludge. The disclosure facilitates the removal of free water, which makes up 70-75% of the water in the sludge. The disclosed method may also have an impact on the interstitial water and surface, or vicinal water due to the interaction of the chlorine dioxide with the sludge particles. According to one embodiment of the present disclosure, a system for altering the particle size distribution of wastewater, for example, secondary municipal sludge and changing the rheology of the material during centrifugal dewatering prior to drying is provided. This system includes the use of chlorine dioxide to modify the characteristics of the material to facilitate drying. The system may comprise a source of municipal sludge or biosolids, a chlorine dioxide treatment unit fluidly connected to and downstream of the source of municipal sludge and configured to produce pretreated biosolids from the municipal sludge; a dewatering device, such as a centrifugal device, to provide a dewatered biosolids; and a dryer to provide a dried biosolids. The dried biosolids may be characterized in that they contain energy in excess of that which is required to dry the material, therefore being a net energy producing process and being able to be classified as a fuel. The dried biosolids may be introduced to the wastewater treatment system for use as a fuel source for the system, for example, a sole fuel source for drying the dewatered biosolids. The dried biosolids may also be burned in the process, for example, incinerated by an incineration process.

The dry solids content of a dewatered biosolids may be between about 16% and 40%. In some embodiments, the dry solids content of the dewatered biosolids may be between about 21% to about 26%. In some embodiments of this disclosure the dry solids content of the dewatered biosolids may be greater than 26%, for example, about 27% to about 37%.

The dry solids content of the dried biosolids may be up to 90%, 95%, 98%, or 100%. For example, the dry solids content of the dried biosolids may be between about 70-90%, 70-95%, 70-98%, or 70-100%.

A method may be provided for altering the rheology of the sludge to facilitate removal of free and bound water. The method may comprise adding chlorine dioxide to the sludge to alter the sludge zeta potential, for example, toward a neutral value for rapid flocculation or coagulation of the biosolids. As is known, zeta potential is a measure of the potential difference between a dispersion medium and the stationary layer of fluid attached to the dispersed particle. A low, or neutral, zeta potential provides for rapid coagulation or flocculation of the particles. The altered sludge may then be dewatered to provide a dewatered biosolids, and dried to provide a dried biosolids.

Figure 2:
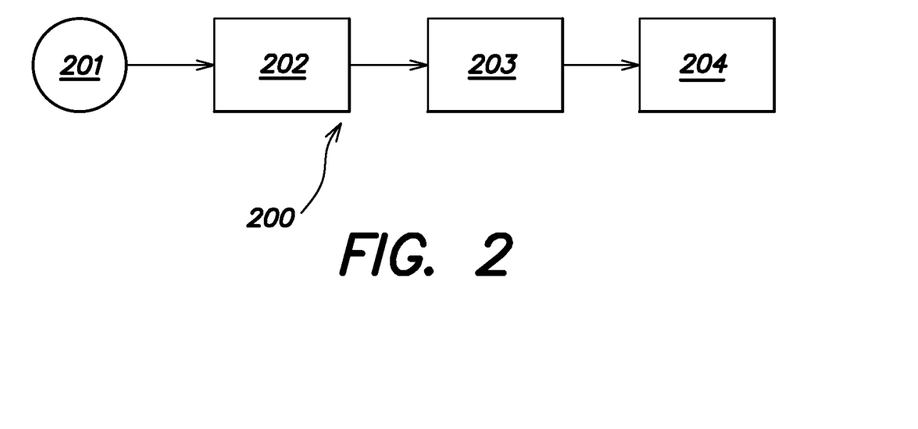
FIG. 2 is a schematic of a system for treating a wastewater according to one embodiment.

A system 200 for treating a wastewater may be provided comprising a chlorine dioxide dosing or generation system 202 fluidly connected to a source of sludge or biosolids 201 (FIG. 2). The system may comprise a dewatering device 203 fluidly connected to and downstream of the chlorine dioxide dosing or generation system 202. The system may further comprise a dryer 204 fluidly connected to and downstream of the dewatering device 203. The dewatering device 203 may be a centrifuge. A conveyor (not pictured) may be provide and positioned downstream of the centrifuge and upstream of the dryer that does not alter the particle size distribution prior to introducing the material for thermal drying. The system may comprise an outlet of the dryer that is fluidly connected to an inlet of the system so as to provide fuel for the system to operate, for example, operate autogenously.

The disclosed method, device, and system offer superior performance and can in fact achieve the goal of autogenous drying or incineration of biosolids, as the method/device/system allow for the preservation of energy value of the material and increases the efficiency of the process to the point where the retained energy value is in excess of what is required for the drying process to be completed.

Without limiting the scope of this disclosure to a particular physical or chemical theory, the use of chlorine dioxide to enhance dewatering and drying of municipal sludge may work by two primary mechanisms; 1) by causing a change in the particle size distribution of the biosolids to allow for greater surface area of the dewatered material and 2) by modifying the rheology of the biosolids to facilitate both dewatering and drying.

This method presents several significant advantages over current methods, including without limitation, reducing the energy required to dry biosolids to typical regulated moisture contents of 10-25%; reducing the energy requirements by a substantial degree, making drying of municipal biosolids economically feasible and competitive with other beneficial reuse or disposal methods; reducing odors during the dewatering and drying process; and combining the retention of intrinsic energy value of the material, with the reduction of energy required for drying, resulting in a system that will sustain autogenous drying of biosolids without external energy sources (electric, gas, solar, etc.).

The present disclosure avoids the limitations of typical drying methods, which require substantial energy input in order to achieve 75-90% total solids content in the dried material.

Figure 3:
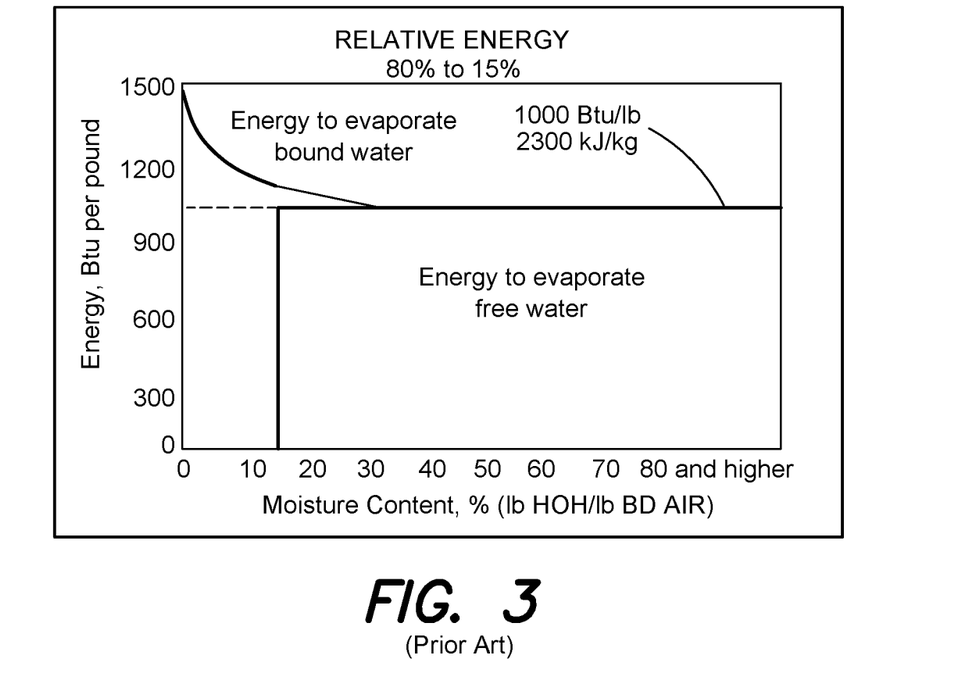
FIG. 3 shows the relative energy required to remove water from sludge under typical conditions.

Referring now to FIG. 3, the relative energy required to remove the various water from sludge under typical conditions is shown. Typical biosolids fuel value of dewatered/digested biosolids is approximately in the range of about 4,000 to about 5,300 Btu/dry lb solids. Typical biosolids fuel value of undigested secondary sludge (waste activated sludge (WAS) or return activated sludge (RAS) is approximately in the range of about 6,000 to about 10,300 Btu/dry lb solids. Typical biosolids fuel value of undigested primary sludge is approximately in the range of about 8,000 to about 11,000 Btu/dry lb solids.

Through use of the systems and methods of the disclosure, processing of non-digested material through the dryer (as a result of the pre-treatment with $ClO_2$), provides a biosolids cake with a relatively high BTU value/dry lb. By making the mechanical dewatering process (centrifuge dewatering) more efficient, we are able to remove more pounds of water from the material than is typical, thus reducing the energy input required to further dry the material to any desired level. By changing the particle size distribution (and most likely making the material less 'sticky'), we further reduce the energy input required to dry (or burn) the material. Through use of the systems and methods of the disclosure, it may also be possible to primary and secondary sludge, which would produce a net increase in BTU value. This material also dewaters extremely well, with the same characteristics as the secondary sludge only. The result is producing a dewatered and dried material with net positive energy (production) rather than net negative energy (consumption).

The function and advantages of these and other embodiments will be more fully understood from the following non-limiting example. The example is intended to be illustrative in nature and is not to be considered as limiting the scope of the embodiments discussed herein.

EXAMPLES

Example 1

Figure 4:
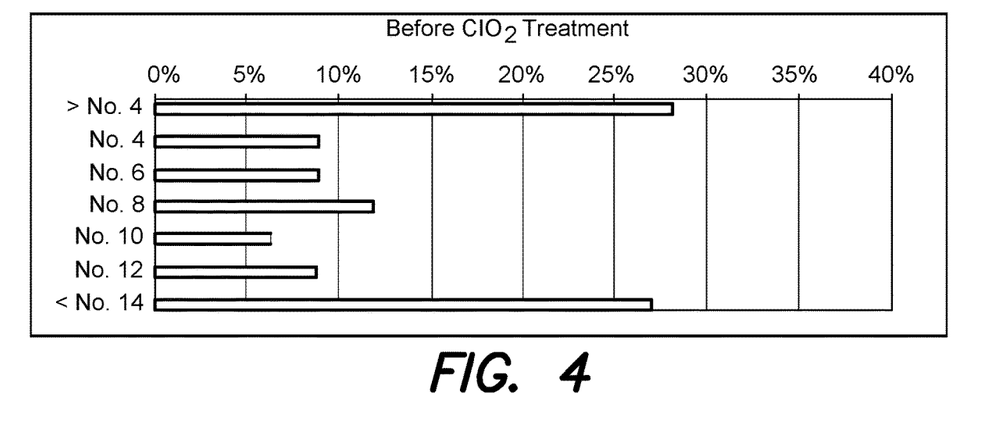
FIG. 4 is a chart of particle size distribution before treatment with chlorine dioxide.

Experiments were conducted to compare the effect of chlorine dioxide added to secondary sludge prior to dewatering, and using a centrifuge, on particle size. Particle size distribution was measured after centrifuge dewatering with and without the addition of chlorine dioxide, and the surface area was calculated. FIG. 4 is a chart of the particle size distribution before treatment with chlorine dioxide. Greater than 25% of the particles were measured as being larger than a No. 4 mesh particle. According to Table 1, a No. 4 mesh particle size has a diameter of 4.76 mm and a surface area of 71.18 $mm^2$. About 25% of the particles were measured as being smaller than a No. 14 mesh particle. According to Table 1, a No. 14 mesh particle size has a diameter of 1.41 mm and a surface area of 6.25 $mm^2$.

TABLE 1

Particle size distribution (mesh size) before $ClO_2$ treatment

| | | Mesh | Diameter (mm) | Radius (mm) | Surface Area ($mm^2$) | Microns | Weight (grams) | Weight Distribution | Volume ($mm^3$) | Volume Distribution ($mm^3$) | Surface Area ($mm^2$) |
|---|---|---|---|---|---|---|---|---|---|---|---|
| | | | | 1st Set of Samples—Pulled from End of Auger | | | | | | | |
| Secondary | Secondary | ≥No. 4 | 4.76 | 2.38 | 71.18 | 4760 | 13.83 | 28% | 56.5 | 28.2 | 11.8 |
| Sludge | Sludge | No. 4 | 4.76 | 2.38 | 71.18 | 4760 | 4.38 | 9% | 56.5 | 8.9 | 3.7 |
| Dewatered | | No. 6 | 3.36 | 1.68 | 35.47 | 3360 | 4.35 | 9% | 19.9 | 8.9 | 5.3 |
| Without $ClO_2$ | | No. 8 | 2.38 | 1.19 | 17.80 | 2380 | 5.82 | 12% | 7.1 | 11.9 | 10.0 |
| Sampled from | | No. 10 | 2.00 | 1.00 | 12.57 | 2000 | 3.11 | 6% | 4.2 | 6.3 | 6.3 |
| Auger After | | No. 12 | 1.68 | 0.84 | 8.87 | 1680 | 4.35 | 9% | 2.5 | 8.9 | 10.5 |
| Centrifuge | | ≤No. 14 | 1.41 | 0.71 | 6.25 | 1410 | 13.25 | 27% | 1.5 | 27.0 | 38.3 |

Figure 5:
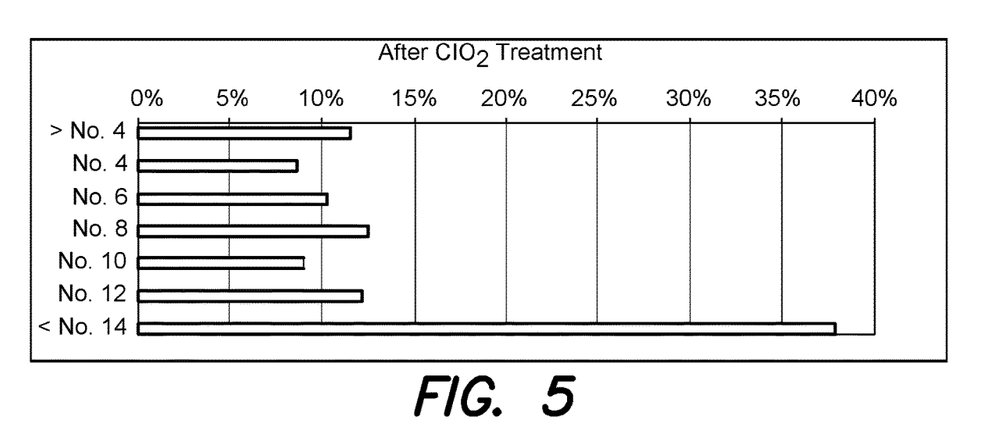
FIG. 5 is a chart of particle size distribution after treatment with chlorine dioxide.

Secondary sludge was then treated with chlorine dioxide, dewatered, and centrifuged. According to FIG. 5, only slightly more than 10% of the particles were measured as being larger than a No. 4 mesh particle size. The number of particles larger than a No. 4 mesh particle decreased from about 25% to about 10% with the addition of chlorine dioxide. In addition, as shown in FIG. 5, greater than about 35% of the particles were measured as being smaller than a No. 14 mesh particle. The number of particles smaller than a No. 14 mesh particle increased from about 25% to about 35% with the addition of chlorine dioxide. Table 1 and Table 2 show that the particle size distribution becomes much smaller, with greater surface after the addition of $ClO_2$ prior to dewatering. This particle size distribution shift produces more surface area, resulting in more efficient drying of the cake.

value/dry lb. By making the mechanical dewatering process (for example, centrifuge dewatering) more efficient, removal of more pounds of water from the material than is typical is achieved, thus reducing the energy input required to further dry the material to any desired level. By changing the particle size distribution (and most likely making the material less 'sticky'), the energy input required to dry (or burn) the material is further reduced.

TABLE 2

Particle size distribution (mesh size) and surface area calculation after treatment with chlorine dioxide prior to centrifuge dewatering

| | | Mesh | Diameter (mm) | Radius (mm) | Surface Area (mm²) | Microns | Weight (grams) | Weight Distribution | Volume (mm³) | Volume Distribution (mm³) | Surface Area (mm²) |
|---|---|---|---|---|---|---|---|---|---|---|---|
| Secondary | Chlorine | ≥No. 4 | 4.76 | 2.38 | 71.18 | 4760 | 4.57 | 11% | 56.5 | 11.3 | 4.8 |
| Sludge | Dioxide | No. 4 | 4.76 | 2.38 | 71.18 | 4760 | 3.38 | 8% | 56.5 | 8.4 | 3.5 |
| Dewatered | Treated | No. 6 | 3.36 | 1.68 | 35.47 | 3360 | 4 | 10% | 19.9 | 9.9 | 5.9 |
| With $ClO_2$ | (Direct | No. 8 | 2.38 | 1.19 | 17.80 | 2380 | 4.92 | 12% | 7.1 | 12.2 | 10.3 |
| Sample | from | No. 10 | 2.00 | 1.00 | 12.57 | 2000 | 3.52 | 9% | 4.2 | 8.7 | 8.7 |
| Collected from | Auger) | No. 12 | 1.68 | 0.84 | 8.87 | 1680 | 4.79 | 12% | 2.5 | 11.9 | 14.1 |
| Trailer After Sitting 1 Day | | ≤No. 14 | 1.41 | 0.71 | 6.25 | 1410 | 15.15 | 38% | 1.5 | 37.6 | 53.3 |

Example 2

Dried biosolids were obtained through treatment with chlorine dioxide, dewatering with a centrifuge, and drying.

The energy per weight of the treated secondary sludge was measured using standard bomb calorimetry methods. Test results with the dried biosolids ranged from about 7,200 to about 10,000 BTU/dry lb. These measurements are in line with the typical numbers obtained for undigested RAS/WAS energy measurements, as discussed above.

Therefore, if one ton per hour of a 27% solids cake is fed to the dryer, the dried material may be back-fed to the dryer to use as fuel. This will also provide a net excess energy available at the end of the process, as shown in Table 3. This will allow the treatment process to operate autogenously, with only outside energy being used in the start-up operation of the system. This will provide for significant cost savings through use of this process.

Using a 90% dry (10% moisture content (M.C.)) as the basis, which may provide approximately 7250 Btu/lb (calculation based on bomb calorimeter testing of the treated secondary sludge having 8062 BTU/dry lb), the following excess energy may be calculated.

TABLE 3

Energy Balance.

| | Case 1 | |
|---|---|---|
| Solids Content of Sludge Cake | 27 | % solids |
| Energy value of dry sludge at 10% M.C. | 7,250 | Btu/lb |
| Dryer Input at 27% Solids | 2,000 | lb/hr |
| Dryer Output at 90% Solids | 600 | lb/hr |
| Evaporation | 1,400 | lb/hr |
| Energy required by BMS | 2,400,000 | Btu/hr |
| Output to Bio-mass Burner | 330 | lb/hr |
| Excess Fuel Available | 270 | lb/hr |
| Excess Energy Available | 1,900,000 | Btu/hr |

Therefore, by being able to process non-digested material through the dryer (as a result of the pre-treatment with $ClO_2$), a biosolids cake is produced with a high BTU value/dry lb. By making the mechanical dewatering process Combining primary and secondary sludge may also be performed in order to produce a net increase in BTU value. This material also dewaters extremely well, with the same characteristics as the secondary sludge only. For example, a split between primary and secondary sludge production could be ~60:40. If the primary sludge contains 10000 BTU/lb and the secondary sludge contains 8000 BTU/lb, a material comprising 9200 BTU/lb dry would be provided. The net energy production would therefore be even higher.

The systems and methods of this disclosure provide for producing a dewatered and dried material with net positive energy (production) rather than net negative energy (consumption).

The energy may then be used to 1) dry the material, or 2) to burn the material (incineration).

Example 3

Capillary Suction Tube (CST) testing was performed using Standard Method 2710G on varying municipal sludge with chlorine dioxide addition ("treated"), and without chlorine dioxide addition ("raw"). CST testing shows how readily, or easily, water is removed from solids. The results showed an average of 16.16% improvement with the treatment of chlorine dioxide. The results from the testing are illustrated in Table 4.

TABLE 4

Capillary Suction Tube Testing

| Radius | Raw | Treated |
|---|---|---|
| r1 | 6.5 | 6 |
| r2 | 26 | 25 |
| r1 | 15.4 | 10.1 |
| r2 | 68 | 45 |
| r1 | 15.3 | 12.5 |
| r2 | 62 | 57 |
| r1 | 38.6 | 31.2 |
| r2 | 146 | 116 |
| r1 | 12.5 | 10.5 |
| r2 | 33.4 | 30.8 |
| r1 | 11.2 | 9.7 |

TABLE 4-continued

Capillary Suction Tube Testing

| Radius | Raw | Treated |
|---|---|---|
| r2 | 34.3 | 28.5 |
| r1 | 11 | 10.6 |
| r2 | 32 | 31 |
| r1 | 18.7 | 16.9 |
| r2 | 57.6 | 51.2 |
| r1 | 19.3 | 18 |
| r2 | 58.8 | 51.3 |
| r1 | 18.8 | 17.8 |
| r2 | 57.4 | 52 |
| Average r1: | 16.73 | 14.33 |
| Average r2: | 57.55 | 48.78 |

Example 4

Figure 6:
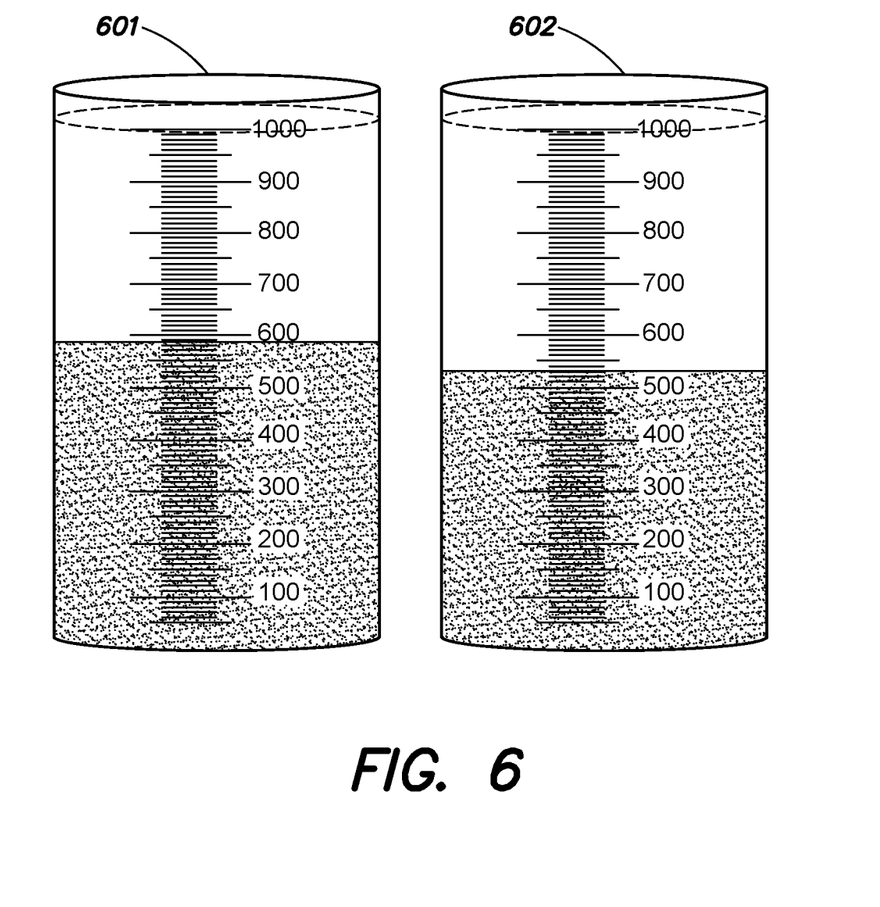
FIG. 6 is a comparison of sludge settling with and without chlorine dioxide treatment.

A settleometer test was performed on 1% total solid municipal sludge. Raw, untreated sludge was compared to sludge treated with chlorine dioxide. FIG. 6 shows the results of the settleometer test. The "raw" sample jar 601 contains sludge without a chlorine dioxide treatment and the treated sample jar 602 contains sludge having been treated with chlorine dioxide. Both jars 601 and 602 are shown after settling for five hours. In five hours, the solids blanket was 9.24% lower on the treated sludge jar 602 than the raw sludge jar 601.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Having thus described several aspects of at least one embodiment, it is to be appreciated various alterations, modifications, and improvements will readily occur to those skilled in the art. Any feature described in any embodiment may be included in or substituted for any feature of any other embodiment. Such alterations, modifications, and improvements are intended to be part of this disclosure, and are intended to be within the scope of the invention. Accordingly, the foregoing description and drawings are by way of example only.

The invention claimed is:

1. A method of treating a sludge or biosolids in a wastewater treatment system, the method comprising:
treating the sludge or biosolids with chlorine dioxide to form a disinfected pretreated biosolids;
dewatering the disinfected pretreated biosolids to provide a disinfected dewatered biosolids;
drying the disinfected dewatered biosolids to provide a dried biosolids; and
introducing the dried biosolids to the wastewater treatment system as a fuel source for drying the disinfected dewatered biosolids.

2. The method of claim 1, wherein the dried biosolids have a dry solids content of at least about 70%.

3. The method of claim 1, further comprising introducing the dried biosolids to the wastewater treatment system as a sole fuel source for drying the disinfected dewatered biosolids.

4. The method of claim 3, wherein drying the disinfected dewatered biosolids comprises passing the disinfected dewatered biosolids through a dryer.

5. The method of claim 3, wherein the disinfected dewatered biosolids have a dry solids content of about 16% to about 40%.

6. The method of claim 1, further comprising burning the dried biosolids.

7. The method of claim 6, wherein burning the dried biosolids comprises incineration.

8. The method of claim 1, wherein the disinfected pretreated biosolids achieve Class B biosolids standards according to U.S. Environmental Protection Agency regulations.

9. The method of claim 1, wherein the dried biosolids achieve Class A biosolids standards according to U.S. Environmental Protection Agency regulations.

10. The method of claim 1, wherein a dosage of chlorine dioxide is about 40 ppm to about 60 ppm.

11. A method for altering the rheology of a sludge to facilitate removal of free and bound water, the method comprising:
adding chlorine dioxide to the sludge to alter the sludge zeta potential toward a neutral value and disinfect the sludge to create a disinfected sludge;
dewatering the disinfected sludge to provide a disinfected dewatered biosolids having a dry solids content of between 16% and 40%;
drying the disinfected dewatered biosolids to provide a dried biosolids having a dry solids content of at least 70%; and
utilizing the dried biosolids as a sole fuel source for drying the disinfected dewatered biosolids.

12. A system for treating a sludge or biosolids comprising:
a chlorine dioxide dosing system fluidly connected to a source of sludge or biosolids that provides a dosage of chlorine dioxide to the sludge or biosolids sufficient to disinfect the sludge or biosolids and produce a disinfected sludge or biosolids;
a dewatering device downstream of the chlorine dioxide dosing system that provides a disinfected dewatered biosolids from the disinfected sludge or biosolids; and
a dryer fluidly connected to and downstream of the dewatering device to dry the disinfected dewatered biosolids and provide a dried biosolids, an outlet of the dryer fluidly connected to an inlet of the system, the dryer utilizing the dried biosolids as a fuel source for drying the disinfected dewatered biosolids.

13. The system of claim 12, wherein the dewatering device is a centrifuge.

14. The system of claim 13, further comprising a conveyor positioned downstream of the centrifuge and upstream of the dryer that does not alter a particle size distribution prior to introducing the disinfected dewatered biosolids for thermal drying.

15. The method of claim 1, further comprising combining primary and secondary sludge to form the sludge or biosolids.

16. The method of claim 11, further comprising combining primary and secondary sludge to form the sludge or biosolids.

17. The system of claim 12, wherein the dryer utilizes the dried biosolids as a sole fuel source for drying the disinfected dewatered biosolids.

* * * * *